UNITED STATES PATENT OFFICE.

BRUNO RICHARD SEIFERT, OF RADEBEUL, NEAR DRESDEN, SAXONY, GERMANY, ASSIGNOR TO DR. F. VON HEYDEN NACHFOLGER, OF SAME PLACE.

PROCESS OF MAKING PARAOXYBENZOIC ACID.

SPECIFICATION forming part of Letters Patent No. 407,906, dated July 30, 1889.

Application filed November 27, 1888. Serial No. 292,006. (No specimens.)

*To all whom it may concern:*

Be it known that I, BRUNO RICHARD SEIFERT, chemist, of Radebeul, near Dresden, in the Kingdom of Saxony, in the German Empire, have invented certain new and useful Improvements in Manufacturing Paraoxybenzoic Acid, of which the following is a specification.

It is well known that paraoxybenzoic acid is produced by heating salicylate of potassium up to 210° Celsius or by conducting carbonic acid over potassium phenate at a temperature of 200° to 220° Celsius and under atmospheric pressure. Under both methods the basic salt of potassium of the paraoxybenzoic acid is produced, while one-half of the phenol is separated off.

1.

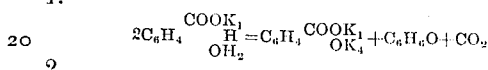

2.

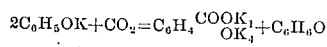

I have now found that that these two reactions take place according to the following equations without separation of the phenol or carbonic acid, if not working in open vessels, as in the methods above referred to, (that is to say, at atmospheric pressure,) but within a closed vessel under pressure:

1ª.

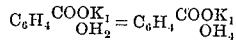

or, 1ᵇ.

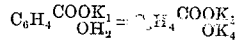

2.

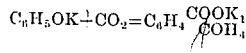

The working of the new process is the following: Dry potassium phenate is heated in a closed vessel under pressure up to 180° to 250° Celsius, and then dry carbonic acid is forced into the hot salt until the latter does not absorb any more of the acid. The carbonic acid thus forced in may be of any pressure above that of the atmosphere. The lowest pressure above zero is sufficient; but twenty or more atmospheres may be employed.

The paraoxybenzoic acid salt manufactured after this method is dissolved in water. From this solution the paraoxybenzoic acid is precipitated by means of a mineral acid.

What I claim as my invention, and desire to secure by Letters Patent, is—

As an improvement in the process of manufacturing paraoxybenzoic acid, the heating of potassium phenate and dry carbonic acid in a closed vessel under a pressure above that of the atmosphere to 180° Celsius or more, substantially as herein described.

In testimony that I claim the foregoing as my invention I have signed my name in presence of two subscribing witnesses.

BRUNO RICHARD SEIFERT.

Witnesses:
WILHELM WIESENHÜTTER,
A. RICHARD KUNZE.